United States Patent [19]

Lagace

[11] Patent Number: 5,515,935
[45] Date of Patent: May 14, 1996

[54] TRACK TENSIONING SYSTEM FOR ENDLESS TRACK-PROPELLED VEHICLE

[75] Inventor: Jean-Hugues Lagace, Lac Etchemin, Canada

[73] Assignee: Vehicules TS Bellechasse LTEE, Quebec, Canada

[21] Appl. No.: 500,288

[22] Filed: Jul. 10, 1995

[51] Int. Cl.⁶ .................................................. B62D 55/084
[52] U.S. Cl. .................. 180/9.1; 180/9.5; 305/21
[58] Field of Search ................. 180/9.1, 9.5; 305/20, 305/21

[56] References Cited

U.S. PATENT DOCUMENTS

| | | | |
|---|---|---|---|
| 2,536,543 | 1/1951 | Focht . | |
| 2,650,818 | 9/1953 | Martin . | |
| 3,151,694 | 10/1964 | Rogers . | |
| 3,190,384 | 6/1965 | Dufresne | 180/9.5 |
| 3,299,978 | 1/1967 | Sponsler . | |
| 3,447,620 | 6/1969 | Schoonover | 305/20 |
| 3,447,621 | 6/1969 | Schoonover | 305/20 |
| 3,471,166 | 10/1969 | Clark . | |
| 3,494,438 | 2/1970 | Rose . | |
| 3,659,669 | 5/1972 | Mazzarins . | |
| 4,185,713 | 1/1980 | Williams et al. . | |
| 4,207,956 | 6/1980 | McColl . | |
| 4,483,407 | 11/1984 | Iwamoto et al. . | |
| 4,781,257 | 11/1988 | Gee et al. | 305/21 |
| 4,817,747 | 4/1989 | Kopczynski . | |
| 5,076,378 | 12/1991 | Lagacé | 180/9.1 |
| 5,373,808 | 12/1994 | Dow et al. | 305/21 |

FOREIGN PATENT DOCUMENTS

| | | | |
|---|---|---|---|
| 898861 | 4/1972 | Canada | 180/9.1 |
| 2057188 | 2/1995 | Canada . | |
| 0593618 | 11/1930 | Germany . | |
| 0591113 | 1/1934 | Germany . | |
| 2216307 | 10/1973 | Germany . | |

*Primary Examiner*—Mitchell J. Hill
*Attorney, Agent, or Firm*—Quarles & Brady

[57] ABSTRACT

A track tensioning system for maintaining a substantially uniform tension on the endless track of a track-propelled vehicle is disclosed herein. The track tensioning system comprises first and second walking beam pivotally mounted on respective lateral sides of a vehicle frame. The first walking beam includes two wheel support members and the second walking beam comprises one wheel support member. The two walking beams are linked through a pivot positioned above a hypothetical line passing through the center of the wheel support assemblies, resulting in an increase or decrease of the effective length of the second walking beam to maintain the tension on the endless track substantially uniform. The effective length of the second walking beam is increased when the vehicle passes over a concave surface and the effective length of the second walking beam is decreased when the vehicle passes over a convex surface.

10 Claims, 3 Drawing Sheets

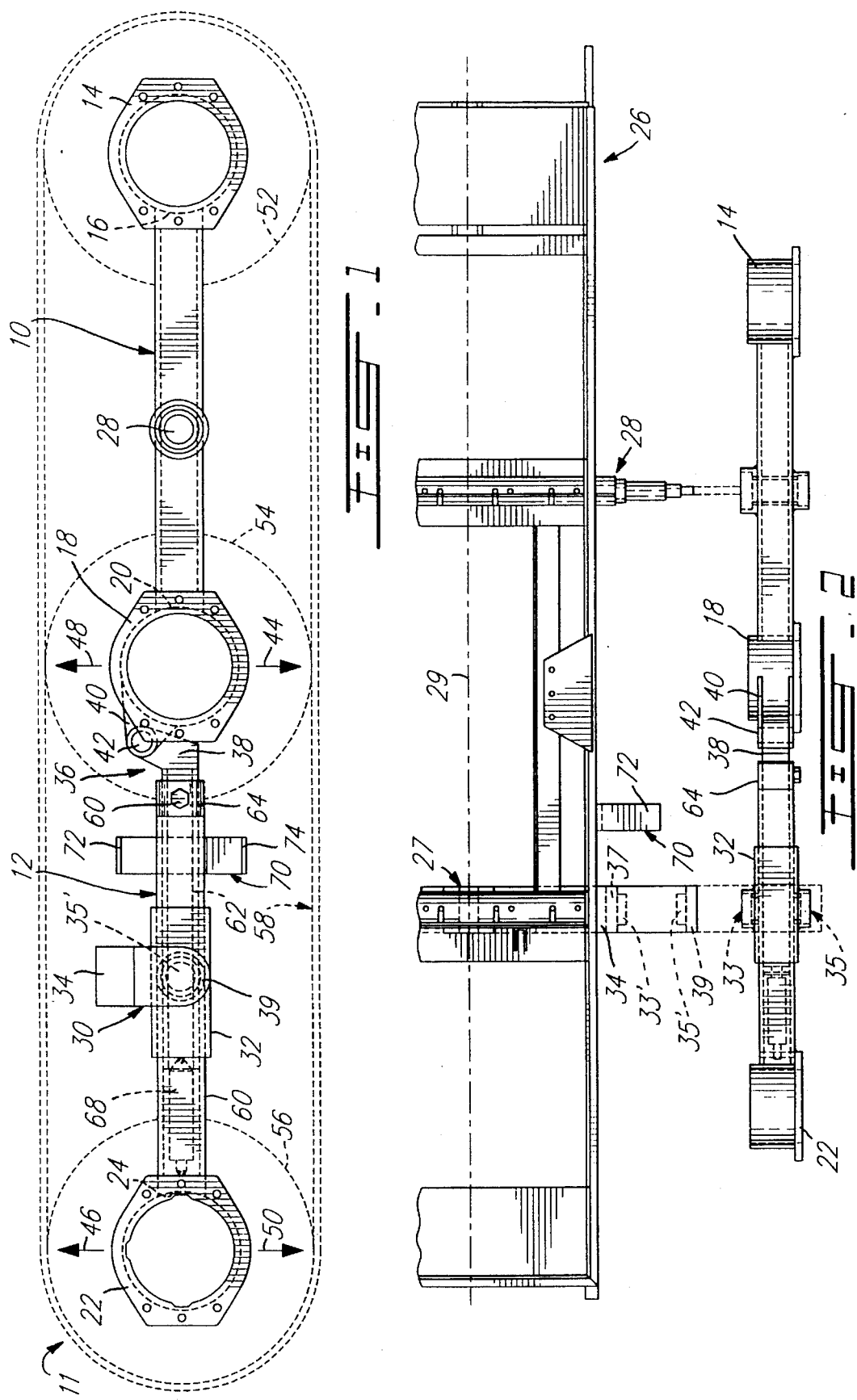

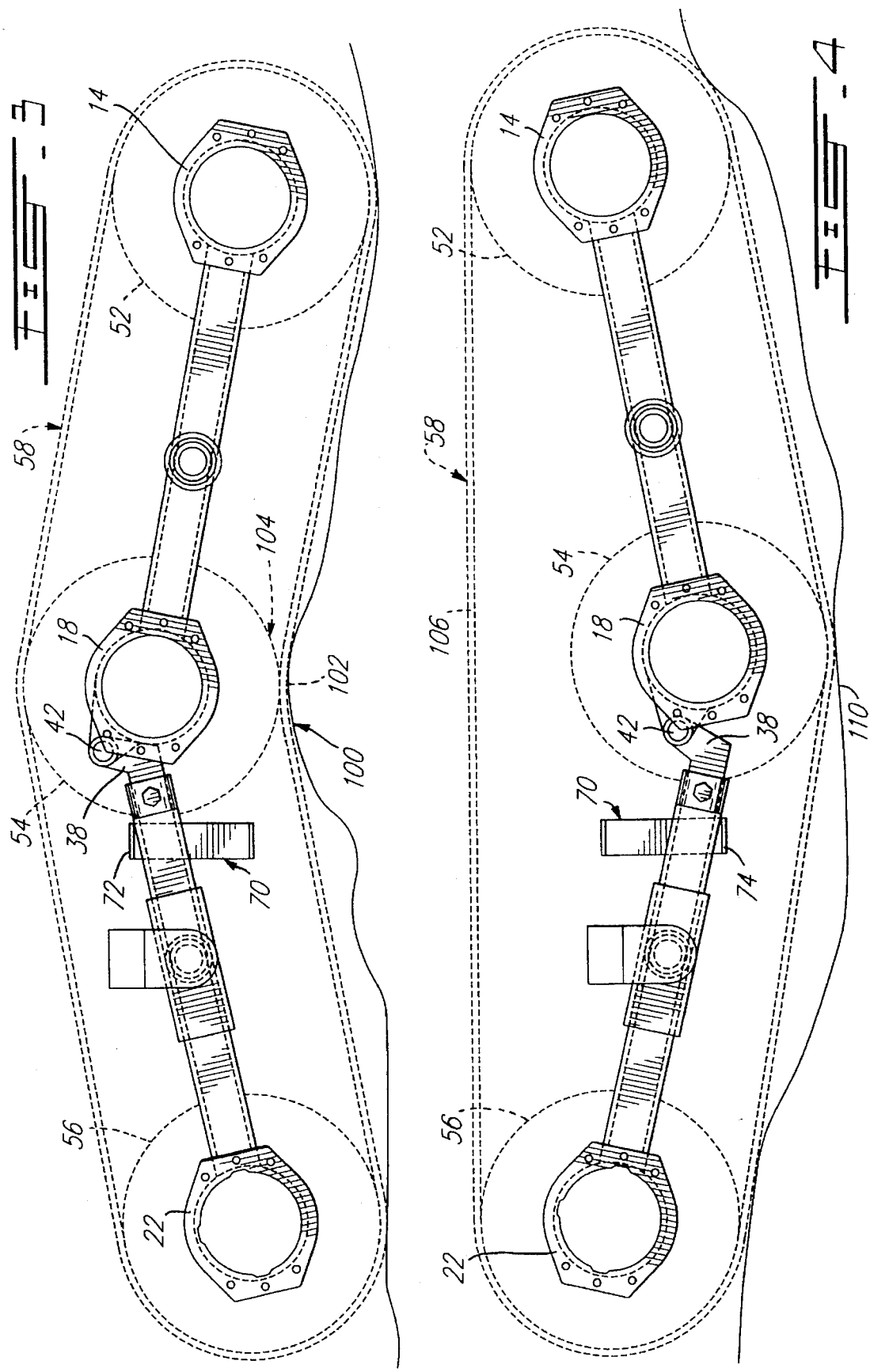

TRACK TENSIONING SYSTEM FOR ENDLESS TRACK-PROPELLED VEHICLE

FIELD OF THE INVENTION

The present invention relates to endless track-propelled vehicles. More specifically, the present invention relates to systems for maintaining a substantially uniform tension on the endless track of track-propelled vehicles.

BACKGROUND OF THE INVENTION

Endless track-propelled vehicles are widely known. These vehicles are primarily used as off-highway vehicles and are usually supported by walking beams arranged in pairs, such that each walking beam on one side of the vehicle is paired with another walking beam on the opposite side and such that a pair of wheel axles and wheels are secured to the opposite longitudinal ends of each walking beam. Such construction is conventionally used for relatively long and heavy endless track-propelled off-highway vehicles to produce the necessary load-bearing capacity (see U.S. Pat. No. 3,471,166 issued to E. G. Clark on Oct. 7, 1969).

It has been proposed by the present inventor, in his U.S. Pat. No. 5,076,378 issued on Dec. 31, 1991, to provide a suspension arrangement for off-highway vehicles wherein a front pair of walking beams and a rear pair of walking beams are joined end-to-end by a simple pivotal joint for positive and simple pivoting of the front beams relative to the rear beams about a transverse axis. In this patent, the inventor provides a telescopic arrangement of one pair of walking beams to allow for extension and contraction of those beams upon up-and-down pivoting of the pairs of walking beams. The shafts pivotally joining the walking beams to the frame of the vehicle are positioned strategically so that the same endless track length is needed substantially throughout the range of relative up-and-down pivotings of the front and rear walking beams.

However, since the telescopic arrangement of one pair of walking beams is located between the two shafts joining the walking beams to the frame of the vehicle, the tension imparted to the endless track is supported by the shafts. It is therefore necessary to provide shafts which are stronger and larger than usual to support this tension and the weight of the vehicle.

Furthermore, since the telescoping portion of one of the walking beams is provided at a location where shearing forces are generated by the up-and-down pivoting of the front and rear beams, premature wear may appear at the telescoping portion of one of the walking beams.

There is therefore a need, in a track tensioning system, for a walking beam arrangement for endless track-propelled vehicles which would ensure a substantially uniform tension on the endless track without causing premature wear to the walking beams.

OBJECT OF THE INVENTION

An object of the present invention is therefore to provide an improved track tensioning system for endless track-propelled vehicles.

SUMMARY OF THE INVENTION

More specifically, in accordance with the present invention, there is provided a track tensioning system for a track-propelled vehicle having a frame and first and second longitudinally spaced shafts extending laterally from each opposite side of the frame; the system comprising:

a first walking beam pivotally mounted to each first shaft and having an inner end and an outer end;

a first wheel support assembly mounted at the outer end of the first walking beam;

a second wheel support assembly mounted at the inner end of the first walking beam;

a second walking beam pivotally mounted to each second shaft and having an inner end and an outer end;

a third wheel support assembly mounted at the outer end of the second walking beam;

means allowing the second walking beam to be longitudinally displaced while being pivotally mounted to the second shaft;

a pivot connection having a pivoting axis; the pivot connection joining the inner end of the second walking beam to the second wheel support assembly; the pivoting axis of the pivot connection lying above a plane comprising the first, second and third wheel support assemblies when the first, second and third wheel support assemblies are coplanar.

Other objects, advantages and features of the present invention will become more apparent upon reading of the following non restrictive description of preferred embodiments thereof, given by way of example only with reference to the accompanying drawings.

BRIEF DESCRIPTION OF THE DRAWINGS

In the appended drawings:

FIG. 1 illustrates a side plan view of a first embodiment of a track tensioning system for an endless track-propelled vehicle according to the present invention;

FIG. 2 illustrates a top plan view of the track tensioning system of FIG. 1 and a portion of a frame of an endless track-propelled vehicle;

FIG. 3 illustrates a side plan view of the track tensioning system of FIG. 1 in operation over a bulging surface;

FIG. 4 illustrates a side plan view of the track tensioning system of FIG. 1 in operation over a surface forming a depression.

DETAILED DESCRIPTION OF PREFERRED EMBODIMENTS

Figure 5:
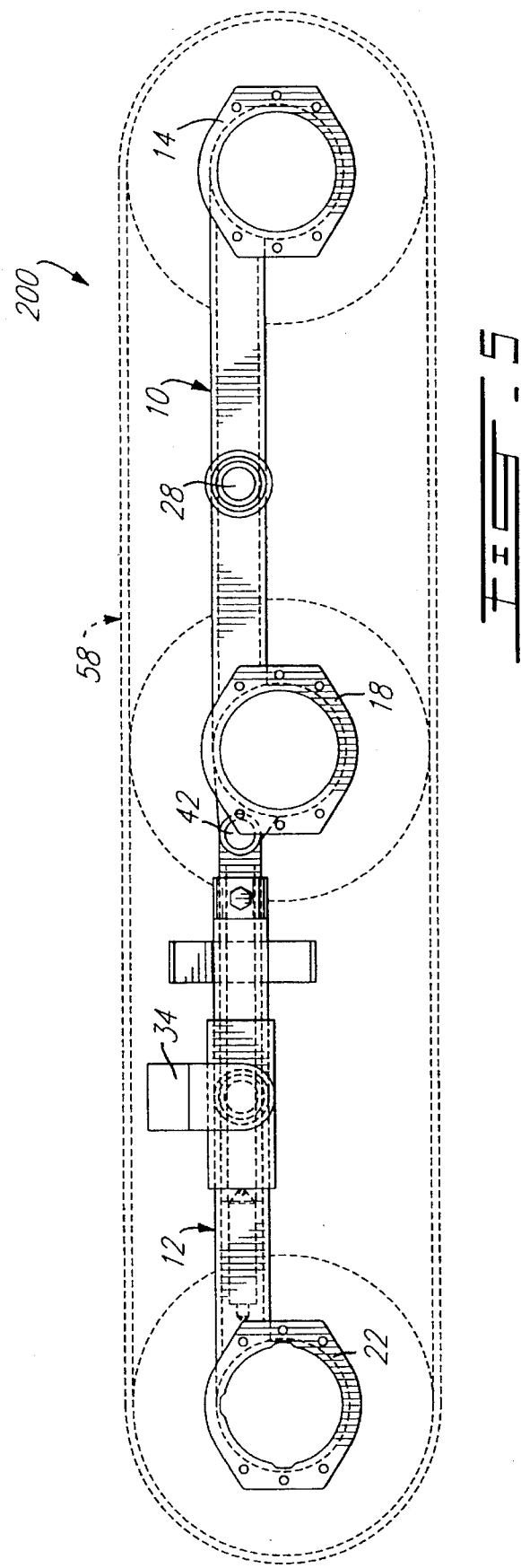
FIG. 5 illustrates a side plan view of a second embodiment of a track tensioning system for an endless track-propelled vehicle according to the present invention.

It is important to note that the following description of preferred embodiments of the present invention will describe only one side of the track tensioning system. It is, however, to be understood that both sides of the track tensioning system are identical.

Referring to FIG. 1, a track tensioning system 11 for an endless track-propelled vehicle (not shown) according to a first embodiment of the present invention will now be described.

The track tensioning system 11 comprises a first walking beam 10 and a second walking beam 12.

The first walking beam 10 has a rectangular cross-section and includes a first wheel support assembly 14 mounted at an outer end 16 of the walking beam 10 and a second wheel support assembly 18 mounted at an inner end 20 of the walking beam 10.

The second walking beam 12 includes a third wheel support assembly 22 mounted at an outer end 24 of the walking beam 12.

It is to be noted that the structure of the first, second and third wheel support assemblies 14, 18 and 22 may vary from the structure illustrated in FIG. 1. Indeed, depending on the type of wheels and on the type of motors being used, the structure of the wheel support assemblies 14, 18 and 22 may be modified to support the wheels and motors used.

Referring to FIGS. 1 and 2, the first walking beam 10 is pivotally mounted to a frame or under-frame 26 through a first shaft 28 extending laterally from the frame 26. The first shaft 28 has a circular cross-section to allow the pivoting of the first walking beam 10 thereon. Of course, bearings or other friction reduction devices may be used to reduce the friction between the first shaft 28 and the first walking beam 10. It is to be understood that the first walking beam 10 may pivot on the second shaft 28 independently from the first walking beam (not shown) mounted on the other side of the frame 26.

The second walking beam 12 has a rectangular external cross-section and is slidably mounted into a tube 32 having internal dimensions slightly larger than the external dimensions of the second walking beam 12 to thereby allow the second walking beam 12 to slide therein. Grease or other lubricating material may be introduced between the external surface of the second walking beam 12 and the internal surface of the tube 32 to decrease the wear of the walking beam 12 and the tube 32.

The tube 32 is pivotally mounted to a second shaft 34 of the frame 26 through an inverted U-shaped pivoting element 30. The shaft 34 has a rectangular cross-section, as illustrated in FIG. 1, and is pivotally mounted to the frame 26 through a conventional pivoting arrangement 27 (FIG. 2) to thereby allow the second shaft 26 to pivot with respect to a longitudinal axis 29 of the frame 26.

As better seen from FIG. 1, the pivoting element 30 is mounted to an underside of the second shaft 34. The inverted U-shaped pivoting element 30 includes a first downwardly extending branch 37 and a second downwardly extending branch 39 spaced apart from the first branch 37 (FIG. 2). The first branch 37 includes a first cylindrical protrusion 33' dimensioned to enter a first aperture 33 of the tube 32. Similarly, the second branch 39 includes a second cylindrical protrusion 35' dimensioned to enter a second aperture 35 of the tube 32. It is to be noted that the first and second cylindrical protrusions 33' and 35' are coaxial, thereby allowing the tube 32 to pivot thereon.

As can be easily understood, one of the first and second branches 37 and 39 of the pivoting element 30 can be removed from the pivoting element 30 to allow the insertion of the second walking beam 12 therebetween. The removed branch is then mounted back to the pivoting element 30.

Again, bearings or other friction reduction devices may be used to reduce the friction between the first and second cylindrical protrusions 33' and 35' and the first and second apertures 33 and 35, respectively.

The second walking beam 12 may pivot with respect to the second shaft 34 of the frame 26 and the second walking beam 12 may longitudinally slide in the tube 32 while being pivotally connected to the second shaft 34 through the inverted U-shaped pivoting element 30. Again, it is to be understood that the second walking beam 12 may pivot on the second shaft 34 independently from the second walking beam (not shown) mounted on the other side of the frame 26.

As can be easily understood, other means could be used to pivotally attach the tube 32 to the shaft 34 while allowing the second walking beam 12 to slide in the tube 32.

The second walking beam 12 includes an inner end 36 having an upwardly angled portion 38, the function of which will be described hereinafter. The second wheel support assembly 18 includes a bracket 40 fixedly mounted thereon. The upwardly angled portion 38 of the inner end 36 of the second walking beam 12 is pivotally mounted to the bracket 40 of the second wheel support assembly 18 through a pivot 42.

Therefore, if the first walking beam 10 is pivoted about the first shaft 28 so that the second wheel support 18 is moved in the direction of arrow 44, the second walking beam 12 is pivoted about the second shaft 34 so that the third wheel support 22 is moved in the direction of arrow 46. Similarly, if the first walking beam 10 is pivoted about the first shaft 28 so that the second wheel support 18 is moved in the direction of arrow 48, the second walking beam 12 is pivoted about the second shaft 34 so that the third wheel support 22 is moved in the direction of arrow 50. These movements are, of course, made possible by the pivot 42 linking the first and second walking beams 10 and 12.

As previously mentioned, this type of track tensioning system may advantageously be installed on a vehicle propelled by an endless track. FIG. 1 of the appended drawings schematically illustrates, in dashed lines, wheels 52, 54 and 56 mounted to the wheel support assemblies 14, 18 and 22, respectively. Also illustrated in this figure is an endless track 58 mounted around wheels 52, 54 and 56.

Since the endless track 58 must be properly tensioned around the wheels 52, 54 and 56, to provide an adequate friction between the wheels 52, 54 and 56 and the track 58, the second walking beam 12 is telescoping. The walking beam 12 is retracted when the endless track 58 is installed or removed and is extended after the installation of the endless track 58, so as to properly tension the endless track 58 around the wheels 52, 54 and 56.

The second walking beam 12 includes an external tube 60 and an internal tube 62 in telescoping relationship with the external tube 60. The external tube 60 includes an adjustable stopping element 64 which may be secured to the internal tube 62 through a fastener 66. The stopping element 64 is provided to set the length of the second walking beam 12 when the required length of the second walking beam 12 is reached. Indeed, since the stopper 64 is mounted to the external tube 60, the length of the second walking beam 12 may not be changed when the fastener 66 of the stopping element 64 is secured to the internal tube 62.

A hydraulic cylinder 68, joining the external tube 60 to the internal tube 62, is provided inside the external tube 60 to force the extension of the second walking beam 12 when the fastener 66 of the stopping piece 64 is not secured to the internal tube 62. Indeed, the hydraulic cylinder 68 produces a pressure pushing the internal tube 62 outside the external tube 60.

As illustrated in FIG. 1, the pivot 42 is located above a hypothetical line (not shown) joining the center of the wheel support assemblies 14, 18 and 22. This is an important feature since it allows the endless track 58 to retain a substantially uniform tension on the wheels 52, 54 and 56 for a limited range of up-and-down movements of the first and second walking beams 10 and 12, as will be described hereinafter with reference to FIGS. 3 and 4. The range of up-and-down movements of the second walking beam 12 is defined by a C-shaped bracket 70 mounted to the side of the frame 26 and having upper 72 and lower 74 branches extending laterally from the frame (see FIG. 2).

FIG. 3 illustrates a side plan view of the track tensioning system 11 of FIG. 1 in operation over a bulging surface 100.

Since the surface 100 presents a convex cross-section, the second wheel support assembly 18 is pushed higher than the first and third wheel support assemblies 14 and 22. A lower portion 102 of the endless track 58 is maintained against a lower portion 104 of the second wheel 54 by the bulging surface 100.

As can be easily understood, the length of the endless track 58 illustrated in FIGS. 1 and 3 does not change. Therefore, to prevent damages to the endless track 58, when the second wheel support assembly 18 rises as illustrated in FIG. 3, the effective length of the second walking beam 12 must be decreased to thereby keep a substantially uniform tension on the endless track 58 and avoid over-tensioning the endless track 58.

As previously mentioned, the pivot 42 joining the first walking beam 10 to the second walking beam 12, is positioned above a hypothetical straight line joining the first, second and third wheel support assemblies 14, 18 and 22, when the first and second walking beams 10 and 12 are in the position of FIG. 1. As illustrated in FIG. 3, this position of the pivot 42, enables the first wheel support assembly 14 to be moved closer to the third wheel support assembly 22 when the endless track 58 is over a bulging surface 100. Indeed, the angle formed by the upwardly angled portion 38 of the inner end 36 of the second walking beam 12 combined with the position of the pivot 42 allow the tension of the endless track 58 to remain substantially uniform for a limited upward movement of the second wheel support assembly 18 by decreasing the effective length of the second walking beam 12.

FIG. 3 illustrates the highest position of the second wheel support assembly 18 for the track tensioning system 11 illustrated. The second walking beam 12 is in contact with the upper branch 72 of the C-shaped bracket 70; therefore, the second wheel support assembly 18 cannot extend higher than the position illustrated in FIG. 3.

FIG. 4 illustrates a side plan view of the track tensioning system 11 of FIG. 1 in operation over a surface forming a depression 110. Since the surface 110 presents a concave cross-section, the second wheel support assembly 18 is pushed lower than the first and third wheel support assemblies 14 and 22. An upper portion 106 of the endless track 58 is not in contact with the second wheel 54.

As can be easily understood, the length of the endless track 58 illustrated in FIGS. 1 and 4 does not change. Therefore, to prevent endless track 58 from being disengaged from the wheels 52, 54 and 58, when the second wheel support assembly 18 is lowered as illustrated in FIG. 4, the effective length of the second walking beam 12 must be increased to thereby keep a substantially uniform tension on the endless track 58 and avoid under-tensioning of the endless track 58.

Again, as illustrated in FIG. 4, the position of the pivot 42 enables the first wheel support assembly 14 to be moved farther from the third wheel support assembly 22 when the endless track 58 is over a surface 110 defining a depression. The angle formed by the upwardly angled portion 38 of the inner end 36 of the second walking beam 12 combined with the position of the pivot 42 allows the tension of the endless track 58 to remain substantially uniform for a limited downward movement of the second wheel support assembly 18 by increasing the effective length of the second walking beam 12.

FIG. 4 illustrates the lowest position of the second wheel support assembly 18 for the track tensioning system 11 illustrated. The second walking beam 12 is in contact with the lower branch 74 of the C-shaped bracket 70; therefore, the second wheel support assembly 18 cannot extend lower than the position illustrated in FIG. 4.

As can be easily understood, by modifying the position of the pivot 42, the angle of the angled portion 38 and/or the length of the angled portion 38, it is possible to design a track tensioning system having a second wheel support assembly 18 which can travel higher than illustrated in FIG. 3 while keeping the tension of the endless track 58 substantially uniform. Similarly, it is possible to design a track tensioning system having a second wheel support assembly 18 which can travel lower than illustrated in FIG. 4 while keeping the tension of the endless track 58 substantially uniform.

FIG. 5 illustrates a second embodiment of a track tensioning system 200 for an endless track-propelled vehicle.

The major difference between the track tensioning system 11 illustrated in FIGS. 1–4 and the track tensioning system 200 illustrated in FIG. 5 is the position of the wheel support assemblies 14, 18 and 22 on the first and second walking beams 10 and 12. The wheel support assemblies 14, 18 and 22 are positioned so that their center is lower than a hypothetical line joining the first shaft 38 to the second shaft 34. Thereby, for maintaining a substantially uniform tension on the endless track 58, as defined hereinabove with reference to FIGS. 3 and 4, the pivot 42 may be positioned at the same level as the first and second shafts 28 and 34, since the wheel support assemblies 14, 18 and 22 are positioned under the shafts 28 and 34.

As can be easily understood, the relative motions of the wheel support assemblies 14, 18 and 22 of the track tensioning system 200 are similar to the relative motions of the wheel support assemblies 14, 18 and 22 of the track tensioning system 11. A substantially uniform tension is maintained on the endless track 58 in the same manner as described hereinabove with reference to FIGS. 3 and 4.

Although the present invention has been described hereinabove by way of preferred embodiments thereof, it can be modified, without departing from the spirit and nature of the subject invention as defined in the appended claims.

What is claimed is:

1. A track tensioning system for a track-propelled vehicle having a frame and first and second longitudinally spaced shafts extending laterally from each opposite side of said frame; said system comprising:

a first walking beam pivotally mounted to each said first shaft and having an inner end and an outer end;

a first wheel support assembly mounted at said outer end of said first walking beam;

a second wheel support assembly mounted at said inner end of said first walking beam;

a second walking beam pivotally mounted to each said second shaft and having an inner end and an outer end;

a third wheel support assembly mounted at said outer end of said second walking beam;

means allowing said second walking beam to be longitudinally displaced while being pivotally mounted to said second shaft;

a pivot connection having a pivoting axis; said pivot connection joining the inner end of the second walking beam to said second wheel support assembly; said pivoting axis of said pivot connection lying above a plane comprising said first, second and third wheel support assemblies when said first, second and third wheel support assemblies are coplanar.

2. A track tensioning system as defined in claim 1 wherein said second walking beam having an adjustable length and comprising a length locking mechanism to allow locking of the length of the second walking beam once a desired length is reached.

3. A track tensioning system as defined in claim 2, wherein said second walking beam includes telescoping arrangement formed by a hollow member and by a telescoping member mounted inside said hollow member; the length adjustment of the second walking beam being performed by telescoping said telescoping member in said hollow member.

4. A track tensioning system as defined in claim 3, wherein said length locking mechanism includes a collar means mounted to said hollow member of said second walking beam, said collar means may be removably secured to said telescoping member of the second walking beam to thereby prevent the telescoping member from telescoping within said hollow member.

5. A track tensioning system as defined in claim 4, wherein said length locking mechanism further comprises an hydraulic cylinder mounted between said telescoping member of said second walking beam and said hollow member of said second walking beam.

6. A track tensioning system as defined in claim 1, wherein said first, second and third wheel support assemblies comprise a motor housing and a motor having a driven axle.

7. A track tensioning system as defined in claim 1, wherein said means allowing said second walking beam to be longitudinally displaced while being pivotally mounted to said second shaft comprise a hollow tube having an internal cross-sectional area slightly larger that an external cross-sectional area of the second walking beam to thereby allow the second walking beam to slide therein; said hollow tube being pivotally mounted to said second shaft.

8. A track tensioning system as defined in claim 7, wherein said second walking beam and said hollow tube have a rectangular cross-section.

9. A track tensioning system as defined in claim 1, further comprising means for limiting the pivoting movement of the first and second walking beams about said first and second shafts.

10. A track tensioning system as defined in claim 9, wherein said means for limiting includes a first abutment member mounted to said frame so as to exceed laterally from said frame above and proximate to said second shaft, a second abutment member mounted to said frame so as to exceed laterally from said frame below and proximate to said second shaft; whereby the pivoting movement of said second walking beam is limited by said first and second abutment members.

* * * * *